United States Patent
Maeda (10) Patent No.: US 7,729,534 B2
(45) Date of Patent: Jun. 1, 2010

(54) IMAGE-PROCESSING DEVICE AND IMAGE-PROCESSING METHOD FOR EXTRACTING A RECOGNITION-TARGET AREA INCLUDING A CHARACTER FROM A TARGET IMAGE

(75) Inventor: Satomi Maeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1027 days.

(21) Appl. No.: 11/075,584

(22) Filed: Mar. 9, 2005

(65) Prior Publication Data

US 2005/0207647 A1  Sep. 22, 2005

(30) Foreign Application Priority Data

Mar. 22, 2004  (JP) ............... 2004-081889

(51) Int. Cl.
*G06K 9/00* (2006.01)

(52) U.S. Cl. .................................... 382/165

(58) Field of Classification Search ........ None
See application file for complete search history.

(56) References Cited

U.S. PATENT DOCUMENTS

| 5,311,336 A | | 5/1994 | Kurita |
| 5,671,072 A | * | 9/1997 | Umemoto .............. 358/501 |
| 5,974,171 A | * | 10/1999 | Hayashi et al. ........ 382/162 |
| 6,735,740 B2 | * | 5/2004 | Sakai et al. ............ 715/526 |
| 6,771,813 B1 | * | 8/2004 | Katsuyama ............ 382/165 |
| 7,046,390 B2 | * | 5/2006 | Atkins .................. 358/1.2 |
| 7,085,006 B2 | * | 8/2006 | Yokoyama et al. ...... 358/1.9 |
| 7,170,647 B2 | * | 1/2007 | Kanatsu ................ 358/453 |
| 7,245,766 B2 | * | 7/2007 | Brown et al. ........... 382/199 |
| 2004/0042662 A1 | * | 3/2004 | Wilensky et al. ....... 382/194 |

FOREIGN PATENT DOCUMENTS

| JP | 02-287892 A | 11/1990 |
| JP | 05-28314 A | 2/1993 |
| JP | 06-203204 A | 7/1994 |
| JP | 09-097309 A | 4/1997 |
| JP | 9-114921 A | 5/1997 |
| JP | 2002-269498 A | 9/2002 |

* cited by examiner

*Primary Examiner*—Yuzhen Ge
(74) *Attorney, Agent, or Firm*—Canon U.S.A., Inc. I.P. Division (57) ABSTRACT

A user specifies a recognition-target area including a character from a target image including the character in the background image. When pixels in the recognition-target area have a color that is close to the color of the pixels on the outline of the recognition-target area, the color of the pixels in the recognition-target area is converted into a predetermined color, that is, the pixels in the recognition-target area are turned transparent, for example. Subsequently, a character-recognition process is performed on the recognition-target area in which the color of the pixels has been converted. According to the device and the method of the present invention, noise and a background image are effectively eliminated.

13 Claims, 7 Drawing Sheets

IMAGE-PROCESSING DEVICE AND IMAGE-PROCESSING METHOD FOR EXTRACTING A RECOGNITION-TARGET AREA INCLUDING A CHARACTER FROM A TARGET IMAGE

BACKGROUND OF THE INVENTION

1. Field of the Invention

The present invention relates to an image-processing device and an image-processing method for character recognition.

2. Description of the Related Art

A rectangular area including a character-recognition target is specified by a user in a method for clipping a character-recognition target in an image including characters for character recognition. In the method for clipping a character-recognition target, more accurate designation of the character area and elimination of noise are required in order to improve the accuracy of character recognition.

For example, conventionally a rectangular area including an area with uniform density is automatically extracted from an image. This method determines that no character is included in a rectangular area with a size smaller than a predetermined size, for example, at an isolated point and thus excludes this area from the character-recognition area.

On the other hand, examples of a known method for eliminating noise include a method in which a binary threshold is set such that the pixels of a character are discriminated from the other pixels based on the density distribution, such as intensity distribution, of the image and a method in which the upper threshold and the lower threshold of the character are set based on the density distribution, and the pixels exceeding this range are eliminated.

Recently, in accordance with an improvement in the performance of information processing devices, there are many cases where color images are subjected to the character-recognition process. Therefore, a method for eliminating noise that focuses on color has been proposed.

For example, Japanese Patent Laid-open No. Hei 6-203204 discloses a method in which characters are clipped by allowing a user to select a color from color samples in, for example, a ledger sheet or by printing a specified color on a marked area which is previously designated for printing the specified color. Furthermore, in Japanese Patent Laid-open No. Hei 5-28314, three colors (RGB) are used as dropout colors, and characters are extracted using an image dropped out with RGB colors.

However, when character recognition is performed on a photo image of a billboard or magazine, the background of characters often includes a picture, illustration, or pattern, which makes it difficult to extract character information. Specifically, when there is little difference in contrast or shade between the characters and the background, it is difficult to set a threshold based on the density distribution and extract accurate character information using the threshold.

Furthermore, in a method for determining a character area based on the size of an area, areas including noise do not have sufficient regularity and thus the size of an area is imperfect to be used for extracting a character area. As a result, there are cases where a character that is not supposed to be connected to target characters is connected to the target characters or a character that is supposed to be connected to the target characters is separated from the characters; that is, the size of the character area differs depending on the quality of an image. Accordingly, a character may be excluded erroneously from the character area as noise.

Furthermore, according to the methods for clipping a character area disclosed in Japanese Patent Laid-open Nos. Hei 6-203204 and Hei 5-28314, it is difficult to perform accurate clipping of a character area on images except the ledger sheet. Moreover, these methods are rather troublesome because a user needs to specify a color from color samples, for example.

SUMMARY OF THE INVENTION

To address the aforementioned problems, the present invention provides an image-processing device and image-processing method in which noise is effectively eliminated from a recognition-target area. Furthermore, the device and the method of the present invention do not require extra work for a user.

According to the present invention, for example, an image-processing device for extracting a recognition-target area including a character from a target image, the device includes: a display for displaying the target image; a recognition-target-area-specifying unit for allowing a user to specify the outline of the recognition-target area in the target image displayed on the display; a comparing unit for comparing the color of pixels on the outline of the recognition-target area specified by the recognition-target-area-specifying unit with the color of pixels in the recognition-target area; and a color-conversion unit for converting the color of the pixels in the recognition-target area into a predetermined converted color when the difference in color between the pixels compared by the comparing unit is within a predetermined range.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of an image-processing device or recognition-target-clipping device according to the present invention will now be described by referring to the accompanying drawings.

Figure 1:
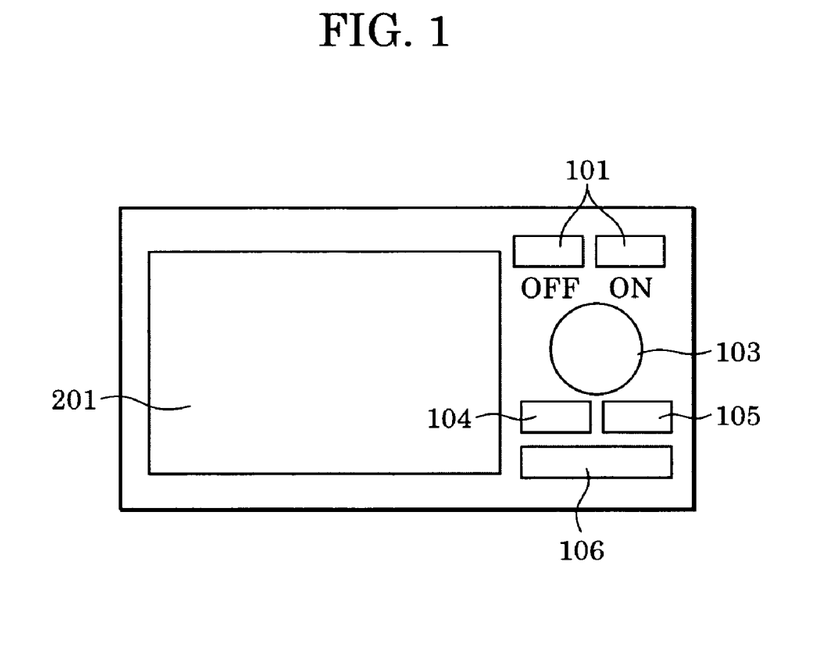
FIG. 1 is an external view of a mobile information-processing device employing an image-processing device according to the present invention.

FIG. 1 is an external view of a mobile information-processing device employing the recognition-target-clipping device of the present invention. Although the mobile information-processing device is exemplified in the embodiment, the recognition-target-clipping device of the present invention is not limited thereto and the present invention may be employed in other electronic devices, such as a desktop computer or a notebook computer.

[Mobile Information-Processing Device]

Referring now to FIG. 1, the mobile information-processing device serving as the recognition-target-clipping device of the present invention includes a liquid crystal display 201 for displaying images to be processed, various data, a graphical user interface (GUI), and the like. A digitizer 202 shown in FIG. 2 for specifying coordinates is disposed on the surface of the liquid crystal display 201.

The mobile information-processing device includes a power switch 101 for turning the power on and off, a cursor key 103, a menu key 104, an exit key 105, and a return key 106. These elements and the GUI on the liquid crystal display 201 allow commands to be input to the mobile information-processing device, for example.

Figure 2:
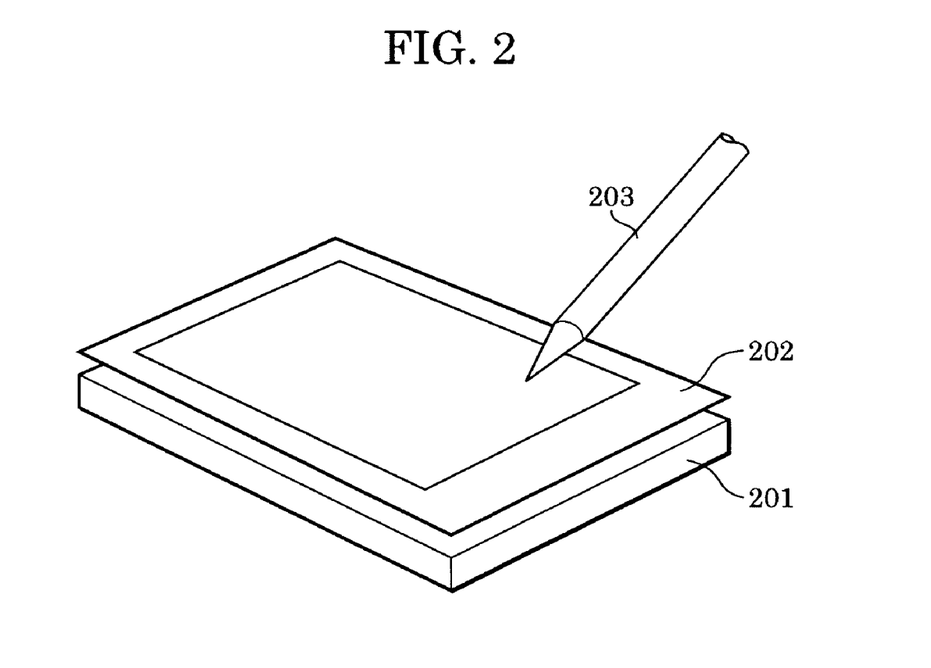
FIG. 2 is a perspective view of a liquid crystal display with a function of inputting coordinates in the mobile information-processing device shown in FIG. 1.

FIG. 2 is a perspective view of the liquid crystal display with a function of inputting coordinates in the mobile information-processing device. In FIG. 2, the liquid crystal display 201 is a full-color liquid crystal display with 480 dots by 640 dots and a diagonal line of 3.5 inches, for example.

The digitizer 202 is composed of, for example, a known resistive film to input coordinates and is disposed on the display surface of the liquid crystal display 201 in parallel. Input to the digitizer 202 is performed by applying pressure on the surface of the digitizer 202 by an input device, such as a pen or stylus 203. Detection of the pressure inputs the coordinates in accordance with the position pressed by the pen 203. Although the pen 203 is used to input coordinates in the present embodiment, coordinates may be input with a pointing device such as a mouse.

Figure 3:
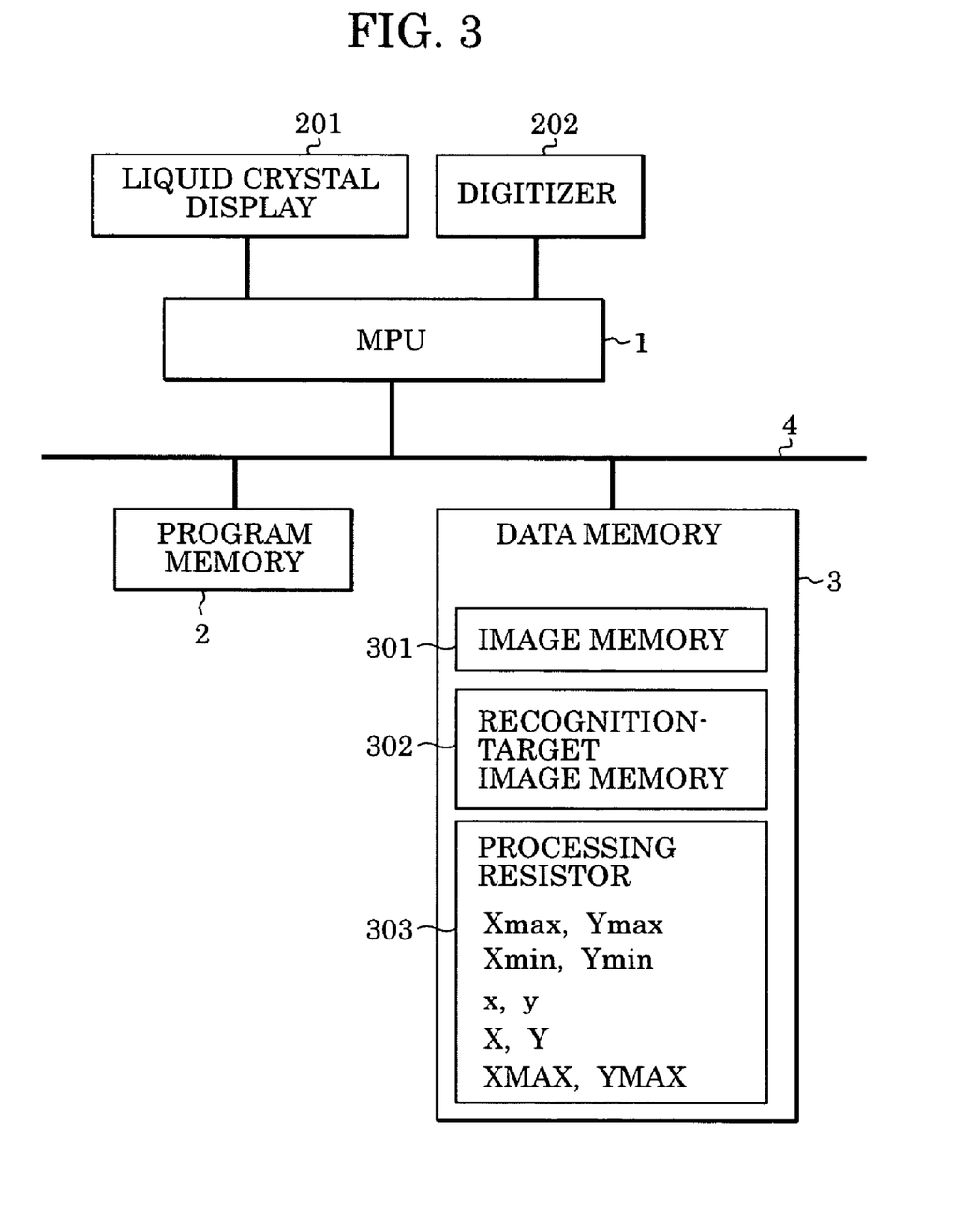
FIG. 3 is a block diagram of the structure of hardware in the mobile information-processing device shown in FIG. 1.

FIG. 3 is a block diagram of the structure of hardware in the mobile information-processing device shown in FIG. 1. Referring to FIG. 3, the mobile information-processing device includes a microprocessor or MPU 1 connected to a bus 4. The MPU 1 performs various computing and logical determination and controls all elements connected to the bus 4.

The MPU 1 sequentially executes programs stored in a program memory 2 to perform processes in accordance with flow charts shown in FIGS. 5 and 6, described below. Although the computer programs to execute processes according to the present invention are stored in the program memory in the present embodiment, the computer programs may be stored in various storage media such as a hard disk, magneto-optical disk, or flash memory.

Data that are generated or used in processes by the MPU 1 are stored in a data memory 3. The data memory 3 is segmented into an image memory 301 for storing a plurality of image data, a recognition-target image memory 302 for storing image data of a recognition-target area in an image to be processed, and a processing resistor 303 for storing various variables, multipliers and the like necessary for processing an image.

The liquid crystal display 201 and the digitizer 202 are connected to the MPU 1 through the bus 4 or another cable. Image data to be processed in the present invention may be transmitted from an external device via, for example, a network interface or may be captured using a memory card, for example. Furthermore, the mobile information-processing device may include a digital camera, and an image taken by the digital camera may be processed.

[Recognition Process]

Figure 4:
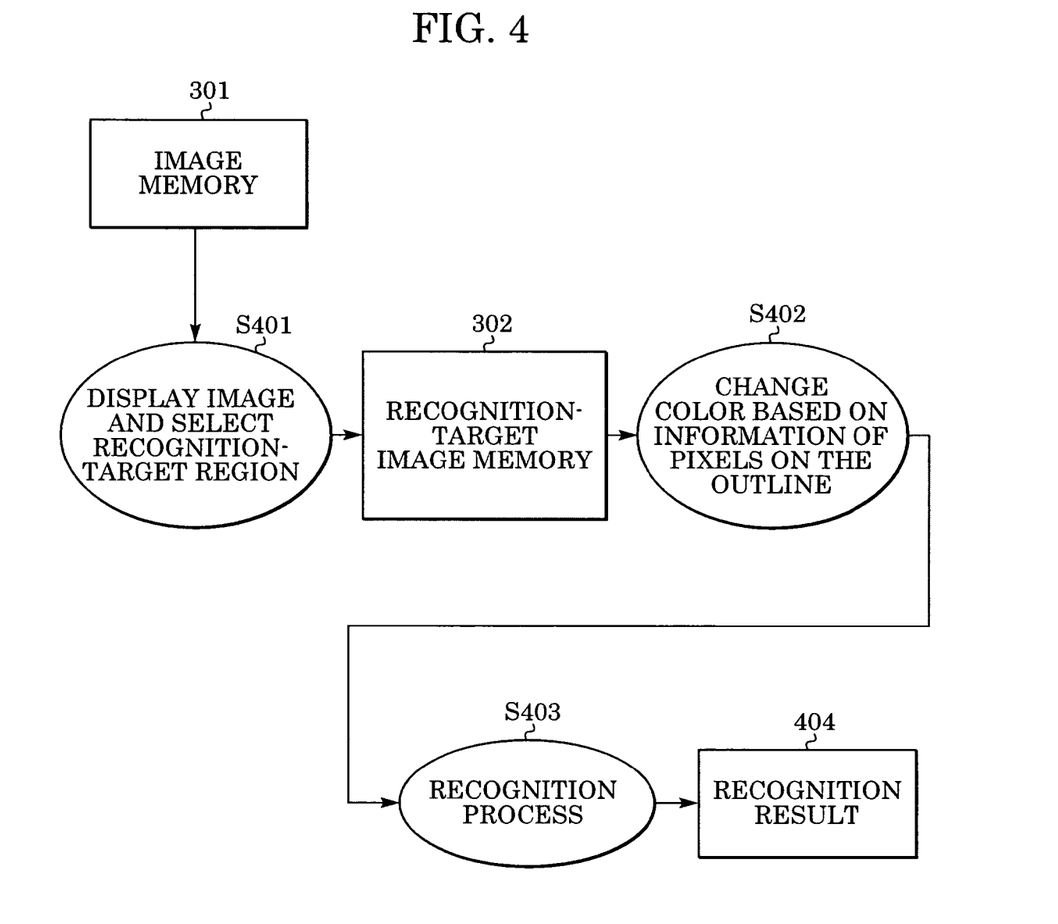
FIG. 4 is a block diagram of a process performed by the mobile information-processing device shown in FIG. 1.

FIG. 4 is a block diagram of a process performed by the mobile information-processing device shown in FIG. 1. In the recognition process by the mobile information-processing device shown in FIG. 4, an image to be processed read out from the image memory 301 is displayed on the liquid crystal display 201, and an area including a character, which is a recognition-target area, within the image to be processed is specified by a user using a digitizer 202 (Step S401).

The recognition-target area is written in the recognition-target image memory 302. The background pixels are determined based on the information of the pixels on the outline of the recognition-target area designated by a user, and the background pixels are changed into a predetermined color. For example, the background pixels are turned transparent in Step S402. The background pixels may be changed into white or other colors. Next, character recognition is performed on the recognition-target area in Step S403, thus obtaining a recognition result 404.

[Method for Clipping a Recognition Target]

Figure 5:
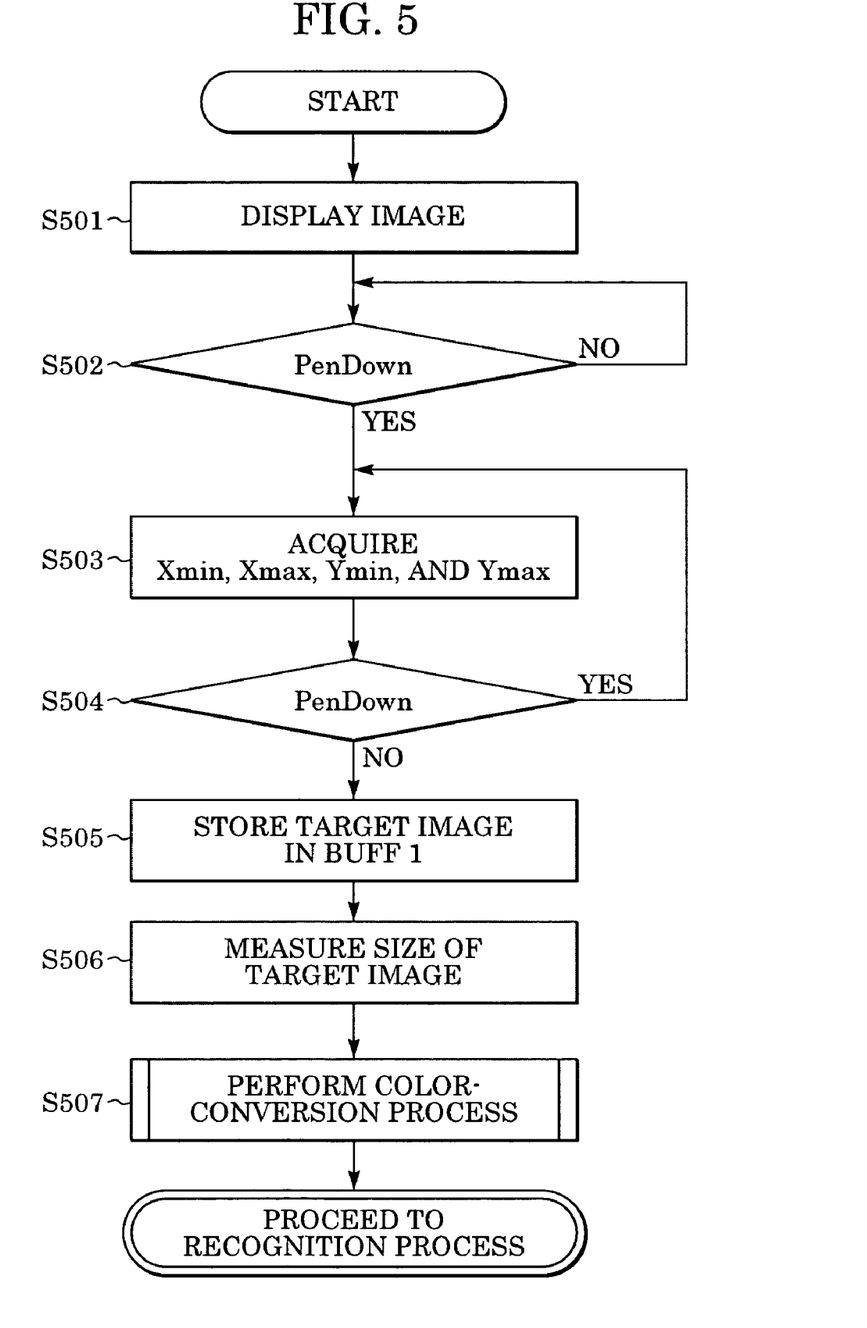
FIG. 5 is a flow chart of an image-processing method performed in the mobile information-processing device shown in FIG. 1.
Figure 6:
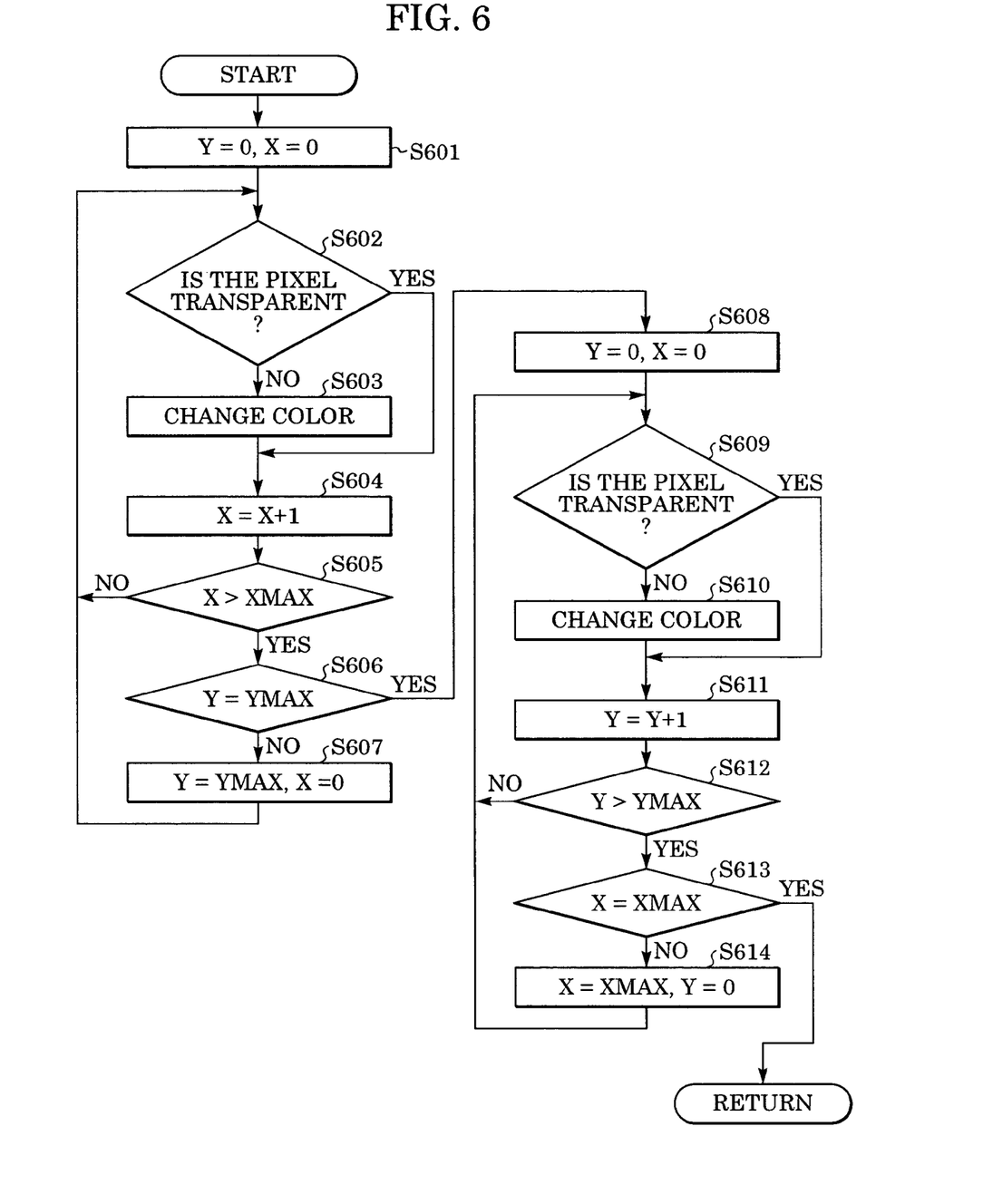
FIG. 6 is a flow chart of a color-conversion process in the image-processing method shown in FIG. 5.

Referring to FIG. 5, processes of clipping a target for character recognition in Steps S401 and S402 are described in detail.

Step S501: Image to be processed is displayed on the liquid crystal display 201 and the process is on standby until PenDown is input, that is, the digitizer 202 is depressed by the pen 203, in Step S502.

Step S502: The MPU 1 determines whether or not PenDown is detected. When PenDown is detected, the process proceeds to Step S503. For example, when the recognition-target area is rectangular, the diagonal points of the rectangular area are specified by dragging the pen after PenDown is input.

Step S503: X-coordinates Xmax and Xmin and Y-coordinates Ymax and Ymin for the diagonal points input in Step S502 are acquired.

Step S504: The MPU 1 determines whether or not PenDown is released. When PenDown is released, the process proceeds to Step S505. When PenDown is not released, the process returns to Step S503.

Step S505: The recognition-target area specified by the user is stored in a BUFF 1 (recognition-target image memory 302).

Step S506: The width and height of the recognition-target area are measured and the measured width and height are assigned to variables x and y to be stored in the processing resistor 303.

Step S507: A process for turning a pixel transparent (color-conversion process), which will be described below with reference to FIG. 6, is started. The MPU 1 determines the background pixels within the recognition-target area, and the color-conversion process is performed on the background pixels. Then, the process proceeds to a recognition process.

Now, the color-conversion process in Step S507 will be described by referring to FIG. 6. In FIG. 6, XMAX=Xmax−Xmin and YMAX=Ymax−Ymin. In the extracted recognition-target area, the left edge is X=0, the right edge is X=XMAX, the top edge is Y=0, and the bottom edge is Y=YMAX.

Step S601: When the color-conversion process is started in Step S507, X and Y are initialized to zero (X=0, Y=0). Accordingly, the first pixel on the target outline is initialized to a pixel with coordinates (0, 0), namely, top left corner of the recognition-target area.

Step S602: The MPU 1 determines whether or not the pixel on the target outline (X, Y) is transparent. When the pixel is not transparent, the process proceeds to Step S603. When the pixel is transparent, the process proceeds to Step S604, skipping Step S603.

Step S603: Pixels with color substantially the same as the color of the pixels on the target outline are determined and these pixels are turned transparent. Then, the process proceeds to Step S604.

The color into which the pixels are turned (converted color) can be arbitrarily selected as long as characters are well defined in the recognition-target area. In the present embodiment, the pixels are turned transparent.

When the outline of the recognition-target area is specified by the pen, pixels with color substantially the same as that of the pixels on the outline of the specified area are changed into the converted color. Alternatively, only the pixels continuous to the outline of the specified area and with color substantially the same as the color of the pixels on the outline of the specified area may be turned transparent.

The determination of whether or not the colors are substantially the same is evaluated, for example, using hamming distance for RGB components of the colors or hamming distance for the RGB components with weights assigned.

Step S604: X is changed into X+1 (X=X+1); that is, the X-coordinate is incremented by one to proceed to Step S605.

Step S605: The MPU 1 determines whether or not X has reached XMAX (the right edge of the recognition-target area). When X>XMAX, the process proceeds to Step S606. When X≦XMAX, the process returns to Step S602.

Step S606: The MPU 1 determines whether or not Y has reached YMAX (the bottom edge of the recognition-target area). When Y=YMAX, the process proceeds to Step S608. When Y<YMAX, the process moves to Step S607.

Step S607: YMAX is substituted into Y and zero into X, and the process returns to Step S602.

Step S608: X and Y are initialized to zero (X=0, Y=0). Accordingly, a target pixel is the pixel with coordinates (0, 0) in the recognition-target area, namely, the top left corner of the recognition-target area.

Step S609: The MPU 1 determines whether or not the pixel on the target outline (X, Y) is transparent. When the pixel on the target outline is not transparent, the process proceeds to Step S610. When the pixel on the target outline is transparent, the process proceed to Step S611, skipping Step S610.

Step S610: Pixels with color substantially the same as that of the pixels on the target outline are determined and turned transparent. Then, the process proceeds to Step S611. Alternatively, only the pixels continuous to the pixels on the outline of the specified area and with color substantially the same as the color of the pixels on the outline of the specified area may be turned transparent.

Step S611: Y is changed to Y+1 (Y=Y+1); that is, Y-coordinate is incremented by one to proceed to Step S612.

Step S612: The MPU 1 determines whether or not Y has reached YMAX (the bottom edge of the recognition-target area). When Y>YMAX, the process proceeds to Step S613. When Y≦YMAX, the process returns to Step S609.

Step S613: The MPU 1 determines whether or not X has reached XMAX (right edge of the recognition-target area). When X<XMAX, the process proceeds to Step S614. When X=XMAX, the color-conversion process is terminated.

Step S614: XMAX is substituted into X and zero into Y, and the process returns to Step S609.

In the above-described color-conversion process, the pixels with color substantially the same as that of the pixels of the outline of the recognition-target area specified by the pen are turned transparent.

Figure 7:
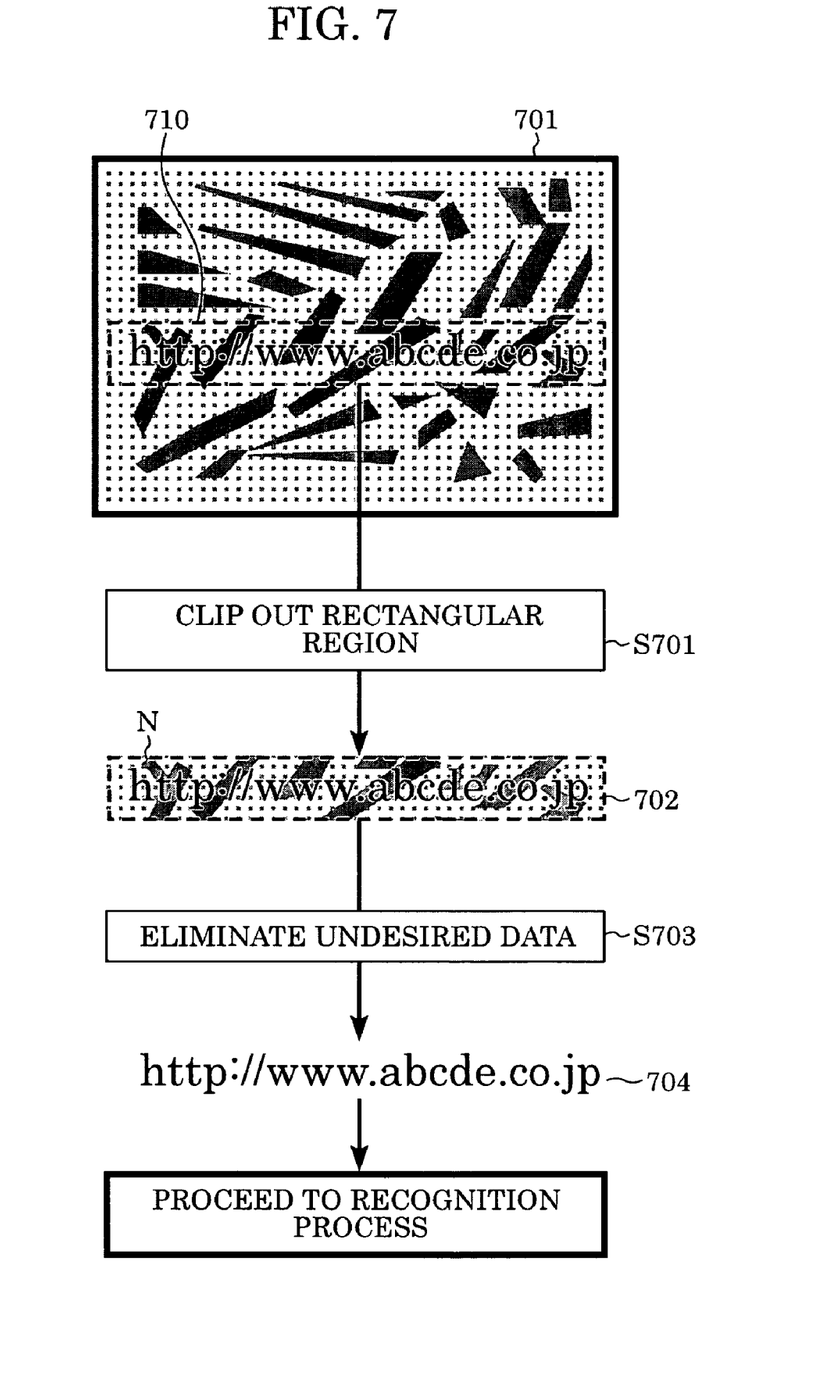
FIG. 7 is a flow chart of the image processing shown in FIG. 5.

FIG. 7 shows an image on which the process according to the present invention is performed. In FIG. 7, a target image 701 read out from the image memory 301 includes http://www.abcde.co.jp on the background of the image. The user specifies a recognition-target area 702 including characters in Step S701. The recognition-target area 702 is enclosed by a broken line 710 in the target image 701 in FIG. 7.

The recognition-target area 702 is stored in the recognition-target image memory 302 and is read out. The recognition-target area 702 includes noise N composed of pixels in the background image and thus these pixels constituting the background image in the recognition-target area 702 are turned transparent by the color-conversion process in Step S703 shown in FIG. 6 and described above.

The color-conversion process changes the recognition-target area 702 into a noise-free-image 704 and thus the characters in the recognition-target area 702 become clear.

Figure 8:
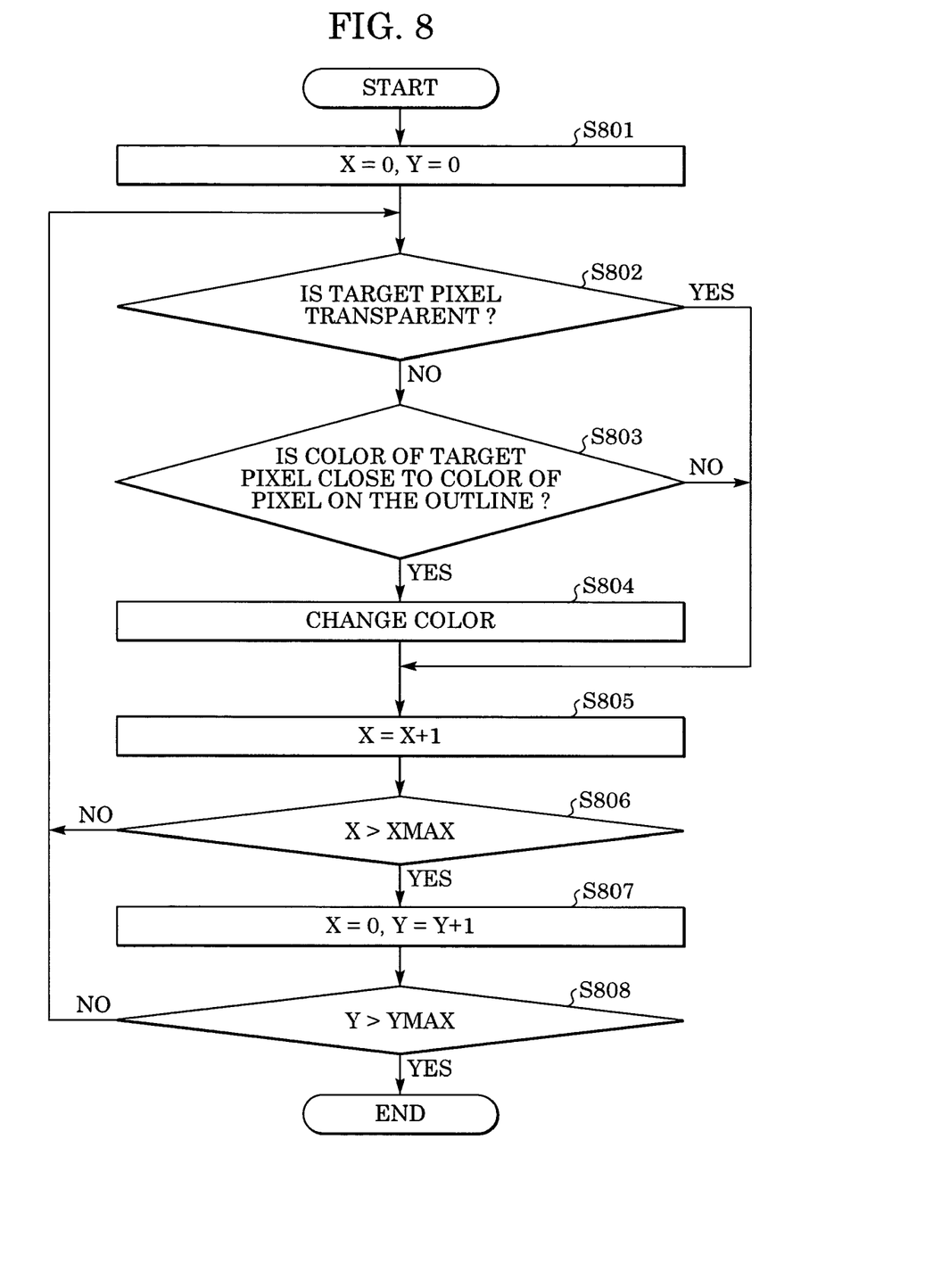
FIG. 8 is a flow chart of a color-conversion process.

FIG. 8 is a flow chart illustrating the color-conversion process in Step S603 and Step S610.

The color-conversion process includes the following steps. It is assumed that the color of the pixels on the target outline subjected to the color-conversion process is obtained in Step S602 and Step 609.

Step S801: A target pixel to be compared in the color-conversion process in the recognition-target area is initialized, that is, the coordinates of the target pixel are changed to X=0 and Y=0 and the process proceeds to Step S802.

Step S802: The MPU 1 determines whether or not the target pixel is the converted color (transparent). When the target pixel has the converted color, the process proceeds to Step S805. When the target pixel does not have the converted color, the process proceeds to Step S803.

Step S803: The MPU 1 determines whether or not the color of the target pixel is close to the color of the pixel on the outline. One method of determining whether the color of the target pixel is close to the color of the pixel on the outline is hamming. When the hamming distance between the color of the target pixel and the color of the pixel on the outline is smaller than or equal to a predetermined distance (i.e., the difference in color between the pixels on the outline of the recognition-target area and the pixels in the target area is within a predetermined range and the pixels on the outline are continuous to pixels in a predetermined vicinity of the recognition-target area), the process proceeds to Step S804. The predetermined distance is calculated experimentally based on the distance function beforehand. When the hamming distance between the color of the pixel on the target pixel and the color of the pixel of the outline is greater than a predetermined distance, the process proceeds to the Step S805. Other methods (other distance function) for determining whether or not the color of the target pixel is close to the color of the pixel on the outline may be used, for example Euclidean distance.

Step S804: The target pixel is changed into the converted color (transparent in the present embodiment) to proceed to Step S805.

Step S805: The X-coordinate of the target pixel is incremented by one to proceed to Step S806.

Step S806: Whether or not the X-coordinate of the target pixel exceeds XMAX is determined. When the X-coordinate exceeds XMAX, the process proceeds to Step S807. When the X-coordinate does not exceed XMAX, the process returns to Step S802.

Step S807: The X-coordinate of the target pixel is initialized to zero and the Y-coordinate of the target pixel is incremented by one to proceed to Step S808.

Step S808: Whether or not the Y-coordinate of the target pixel exceeds YMAX is determined. When the Y-coordinate of the target pixel exceeds YMAX, the process is terminated. When the Y-coordinate of the target pixel does not exceed YMAX, the process returns to Step S802.

As described above, with the device and method of the present invention, first the recognition-target area including the entire characters subjected to character recognition is specified. The pixels on the outline of the recognition-target area are regarded as noise, and the pixels with color substantially the same as that of the pixels on the outline within the recognition-target area are turned into the converted color, thus eliminating noise in the recognition-target area.

In the process described above, the pixels not on the outline of the recognition-target area is excluded when determining the presence of noise. To address this, besides the above-described process, application of a number of algorithms for noise elimination assures more effective clipping of a recognition target (characters).

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-081889 filed on Mar. 22, 2004, which is hereby incorporated by reference herein.

What is claimed is:

1. An image-processing device for extracting a recognition-target area including a character from a target image, the image processing device comprising:
    a display displaying the target image;
    a recognition-target-area-specifying unit allowing a user to specify an outline of the recognition-target area in the target image displayed on the display;
    a determination unit determining a plurality of colors existing on the outline of the recognition-target area specified by the recognition-target-area-specifying unit;
    a comparing unit comparing each of the plurality of colors determined by the determination unit with colors of pixels included in the recognition-target area;
    a color-conversion unit converting colors of the pixels included in the recognition-target area into a predetermined converted color when a result of the comparing unit finds that the difference between the colors of the pixels included in the recognition-target area and one of the plurality of colors existing on the outline of the recognition target area is within a predetermined range; and
    a character-recognition unit performing a character-recognition process on the recognition-target area in which the color of the pixels has been changed by the color-conversion unit.

2. The image-processing device according to claim 1, wherein the pixels included in the recognition-target area are turned transparent by the color-conversion unit.

3. The image-processing device according to claim 1, wherein the colors of the pixels included in the recognition-target area is changed into white by the color-conversion unit.

4. The image-processing device according to claim 1, wherein a touch panel is used when the user specifies the outline of the recognition-target area in the recognition-target-area-specifying unit.

5. The image-processing device according to claim 1, wherein a pointing device is used when the user specifies the outline of the recognition target area in the recognition-target-area-specifying unit.

6. The image-processing device according to claim 1, wherein the color-conversion unit changes colors of the pixels included in the recognition-target area into the converted color when the difference between each of the colors determined by the determination unit and the colors of the pixels included in the recognition-target area compared by the comparing unit is within a predetermined range and the pixels existing on the outline are continuous to pixels in a predetermined vicinity of the recognition-target area.

7. An image-processing method, performed by an image processing device including a display and a processing unit, for extracting a recognition-target area including a character from a target image, the image processing method comprising:
    a displaying step for displaying the target image on the display;
    a recognition-target-area-specifying step, performed by the processing unit, for allowing a user to specify an outline of the recognition-target area in the target image displayed in the displaying step;
    a determination step for determining a plurality of colors existing on the outline of the recognition-target area specified in the recognition-target-area-specifying step;
    a comparing step, performed by the processing unit, for comparing each of the plurality of colors determined in the determination step with colors of pixels included in the recognition-target area;
    a color-conversion step, performed by the processing unit, for converting the colors of the pixels included in the recognition-target area into a predetermined converted color when a result of the comparing step finds that the difference between the colors of the pixels included in the recognition-target area and one of the plurality of colors existing on the outline of the recognition-target area is within a predetermined range; and
    a character-recognition step, performed by the processing unit, for performing a character-recognition process on the recognition-target area in which the color of the pixels has been changed in the color-conversion step.

8. The image-processing method according to claim 7, wherein the pixels included in the recognition-target area are turned transparent in the color-conversion step.

9. The image-processing method according to claim 7, wherein the color of the pixels included in the recognition-target area is changed into white in the color-conversion step.

10. The image-processing method according to claim 7, wherein a touch panel is used when the user specifies the outline of the recognition-target area in the recognition-target-area-specifying step.

11. The image-processing method according to claim 7, wherein a pointing device is used when the user specifies the outline of the recognition-target area in the recognition-target-area-specifying step.

12. The image-processing method according to claim 7, wherein the color of the pixels included in the recognition-target area is changed into the converted color in the color-conversion step when the difference in color between the pixels existing on the outline of the recognition-target area and the pixels included in the recognition-target area compared in the comparing step is within a predetermined range and the pixels existing on the outline are continuous to pixels in a predetermined vicinity of the recognition-target area.

13. A computer-readable storage medium storing computer program code for allowing a computer to perform the following steps:

a displaying step for displaying a target image;

a recognition-target-area-specifying step for allowing a user to specify an outline of a recognition-target area in the target image displayed in the displaying step;

a determination step for determining a plurality of colors existing on the outline of the recognition-target area specified in the recognition-target-area-specifying step;

a comparing step for comparing each of the plurality of colors determined by the determination step with a color of pixels included in the recognition-target area;

a color-conversion step for converting colors of the pixels included in the recognition-target area into a predetermined converted color when a result of the comparing step finds that the difference between the colors of the pixels included in the recognition-target area and one of the plurality of colors existing on the outline of the recognition-target area is within a predetermined range; and a character-recognition step for performing a character-recognition process on the recognition-target area in which the color of the pixels has been changed in the color-conversion step.

* * * * *